United States Patent
Kenoyer et al.

(10) Patent No.: US 7,667,728 B2
(45) Date of Patent: Feb. 23, 2010

(54) VIDEO AND AUDIO CONFERENCING SYSTEM WITH SPATIAL AUDIO

(75) Inventors: Michael L. Kenoyer, Austin, TX (US); William V. Oxford, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 835 days.

(21) Appl. No.: 11/252,188

(22) Filed: Oct. 17, 2005

(65) Prior Publication Data

US 2006/0104458 A1    May 18, 2006

Related U.S. Application Data

(60) Provisional application No. 60/619,212, filed on Oct. 15, 2004, provisional application No. 60/676,918, filed on May 2, 2005, provisional application No. 60/675,965, filed on Apr. 29, 2005, provisional application No. 60/675,962, filed on Apr. 29, 2005.

(51) Int. Cl.
*H04N 7/14* (2006.01)
*H04M 3/42* (2006.01)

(52) U.S. Cl. ............... 348/14.08; 348/14.12; 348/14.13

(58) Field of Classification Search ... 348/14.01–14.16; 379/202.01, 406.01; 381/92, 122

See application file for complete search history.

(56) References Cited

U.S. PATENT DOCUMENTS

| | | | |
|---|---|---|---|
| 4,264,928 | A | 4/1981 | Schober |
| 5,034,947 | A | 7/1991 | Epps |
| 5,054,021 | A | 10/1991 | Epps |
| 5,335,011 | A * | 8/1994 | Addeo et al. ............... 348/14.1 |
| 5,374,971 | A | 12/1994 | Clapp et al. |
| 5,486,853 | A | 1/1996 | Baxter et al. |

(Continued)

FOREIGN PATENT DOCUMENTS

JP    02202275 A  *  8/1990

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Melur Ramakrishnaiah
(74) *Attorney, Agent, or Firm*—Meyertons Hood Kivlin Kowert & Goetzel, P.C.; Jeffrey C. Hood

(57) ABSTRACT

In some embodiments, spatially realistic audio may be provided for a conference call. Voices from participants on the left side of a display, in a conference call, may be directed through audio on the left side of the display at the other conferencing system in the conference call (similarly for voices from the center and right side of the display). In some embodiments, two speakers may be used in the system to create synthesized stereo sound at a location specified by directional information received as side information along with the existing audio channel. The location may be determined by using beamforming with integrated microphones on a camera or speakerphone. In some embodiments, the audio signal and directional information may be sent in the form of a left audio channel and a right audio channel.

14 Claims, 15 Drawing Sheets

U.S. PATENT DOCUMENTS

| | | | |
|---|---|---|---|
| 5,515,099 | A | 5/1996 | Cortjens et al. |
| 5,528,289 | A | 6/1996 | Cortjens et al. |
| 5,537,157 | A | 7/1996 | Washino et al. |
| 5,598,209 | A | 1/1997 | Cortjens et al. |
| 5,612,733 | A | 3/1997 | Flohr |
| 5,617,539 | A | 4/1997 | Ludwig et al. |
| 5,633,681 | A | 5/1997 | Baxter et al. |
| 5,657,096 | A | 8/1997 | Lukacs |
| 5,689,641 | A | 11/1997 | Ludwig et al. |
| 5,692,159 | A | 11/1997 | Shand |
| 5,737,011 | A | 4/1998 | Lukacs |
| 5,737,431 | A | 4/1998 | Brandstein et al. |
| 5,751,338 | A | 5/1998 | Ludwig, Jr. |
| 5,764,277 | A | 6/1998 | Loui et al. |
| 5,821,987 | A | 10/1998 | Larson |
| 5,856,970 | A * | 1/1999 | Gee et al. .................. 370/286 |
| 5,896,128 | A | 4/1999 | Boyer |
| 6,072,522 | A | 6/2000 | Ippolito et al. |
| 6,124,892 | A | 9/2000 | Nakano |
| 6,356,308 | B1 | 3/2002 | Hovanky |
| 6,587,823 | B1 | 7/2003 | Kang et al. |
| 6,590,604 | B1 | 7/2003 | Tucker et al. |
| 6,593,956 | B1 | 7/2003 | Potts et al. |
| 6,594,688 | B2 | 7/2003 | Ludwig et al. |
| 6,643,462 | B2 | 11/2003 | Harand et al. |
| 6,724,619 | B2 | 4/2004 | Kwong et al. |
| 6,731,334 | B1 | 5/2004 | Maeng et al. |
| 6,809,358 | B2 | 10/2004 | Hsieh et al. |
| 6,816,904 | B1 | 11/2004 | Ludwig et al. |
| 6,822,507 | B2 | 11/2004 | Buchele |
| 6,850,265 | B1 | 2/2005 | Strubbe et al. |
| 6,912,178 | B2 | 6/2005 | Chu et al. |
| D510,589 | S | 10/2005 | Andre et al. |
| 6,980,485 | B2 | 12/2005 | McCaskill |
| 6,987,992 | B2 * | 1/2006 | Hundal et al. ............ 455/569.1 |
| 7,012,630 | B2 | 3/2006 | Curry et al. |
| 7,038,709 | B1 | 5/2006 | Verghese |
| 7,046,295 | B2 | 5/2006 | Hovanky |
| 7,130,428 | B2 | 10/2006 | Hirai et al. |
| 7,202,904 | B2 | 4/2007 | Wei |
| 7,339,605 | B2 * | 3/2008 | Rodman et al. .......... 348/14.07 |
| 7,397,495 | B2 | 7/2008 | Girish et al. |
| 2004/0001137 | A1 * | 1/2004 | Cutler et al. ............. 348/14.08 |
| 2004/0183897 | A1 | 9/2004 | Kenoyer et al. |
| 2004/0257432 | A1 | 12/2004 | Girish et al. |
| 2005/0008169 | A1 * | 1/2005 | Muren et al. .................. 381/92 |
| 2005/0212908 | A1 | 9/2005 | Rodman et al. |
| 2005/0262201 | A1 | 11/2005 | Rudolph et al. |
| 2006/0013416 | A1 | 1/2006 | Truong et al. |
| 2006/0034469 | A1 | 2/2006 | Tamiya et al. |
| 2006/0082655 | A1 | 4/2006 | Vanderwilt et al. |
| 2006/0104458 | A1 | 5/2006 | Kenoyer et al. |
| 2006/0104633 | A1 | 5/2006 | Kenoyer et al. |
| 2006/0165242 | A1 | 7/2006 | Miki et al. |
| 2006/0238611 | A1 | 10/2006 | Kenoyer et al. |
| 2006/0269278 | A1 | 11/2006 | Kenoyer et al. |

FOREIGN PATENT DOCUMENTS

| | | | |
|---|---|---|---|
| JP | 07058859 | A * | 3/1995 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

Peter Klein; "Video Workplace Conference"; IEEE Proceedings of Globecom; 1985; pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, http://research.microsoft.com/users/ivantash/Documents/MicArraysInMSR.pdf; Jun. 2004; 49 pages.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

"Polycom Executive Collection"; Jun. 2003; 4 pages; Polycom, Inc.; Pleasanton, CA.

Machine translation of JP 2000197151, 11 pages.

Office Action of May 14, 2008, in U.S. Appl. No. 11/119,584, 17 pages.

Meyers, Peter; "Adding Eye Contact to Your Web Chats"; The New York Times; Sep. 4, 2003; 5 pages.

Office Action of Mar. 19, 2008, in U.S. Appl. No. 11/251,083, 20 pages.

U.S. Appl. No. 11/406,071, entitled "Audio based on speaker position and/or conference location", by Michael L. Kenoyer, et al., filed on Apr. 18, 2006.

* cited by examiner

VIDEO AND AUDIO CONFERENCING SYSTEM WITH SPATIAL AUDIO

PRIORITY

This application claims priority to U.S. Provisional Patent Application Ser. No. 60/619,212 titled "Video Conferencing Speakerphone", which was filed Oct. 15, 2004, whose inventors are Michael L. Kenoyer, Craig B. Malloy, and Wayne E. Mock which is hereby incorporated by reference in its entirety as though fully and completely set forth herein.

This application also claims priority to U.S. Provisional Patent Application Ser. No. 60/676,918, titled "Audio and Video Conferencing", which was filed May 2, 2005, whose inventors are Michael L. Kenoyer, Wayne Mock, and Patrick D. Vanderwilt which is hereby incorporated by reference in its entirety as though fully and completely set forth herein.

This application further claims priority to U.S. Provisional Patent Application Ser. No. 60/675,965 titled "Video and Audio Conferencing System With Spatial Audio", which was filed Apr. 29, 2005, whose inventors are Michael L. Kenoyer, Wayne E. Mock, and Craig B. Malloy which is hereby incorporated by reference in its entirety as though fully and completely set forth herein.

This application further claims priority to U.S. Provisional Patent Application Ser. No. 60/675,962 titled "Audio Based on Speaker Position and/or Conference Location", which was filed Apr. 29, 2005, whose inventor is Michael L. Kenoyer which is hereby incorporated by reference in its entirety as though fully and completely set forth herein.

BACKGROUND OF THE INVENTION

1. Field of the Invention

The present invention relates generally to conference systems and, more specifically, to video and audio conferencing systems.

2. Description of the Related Art

People may communicate vocally through various devices including telephones, cellular phones, and Internet phones. People may also communicate with each other through video communication devices (e.g., through video conferencing systems). In a video conference, cameras and microphones located at local and remote sites may capture video and audio of conference participants to transmit to the other respective site. In addition, each video conference site may include a display and a speaker for reproducing the received video and audio signals.

Video conference calls allow multiple participants at different video conference sites to interact with each other face to face (i.e., through video). Because a conference system may be communicating with several other conference systems, each with multiple participants, it may become very difficult to discern who is speaking or from which conference site the current participant is speaking.

SUMMARY OF THE INVENTION

In some embodiments, spatially realistic audio may be provided for a video call. In some embodiments, voices coming from the people on the left side of the display, in a video call, may be directed through audio on the left side of the display at the remote unit (similarly for voices from the center and right side of the display). This may result in giving the conference participants a realistic audio experience that may match the realism of the video experience.

In various embodiments, a videoconferencing system at a first location may provide stereo audio to a remote videoconferencing system by using microphones on a speakerphone and camera at the first location. In some embodiments, an audio signal may be captured by speakerphone microphones. In some embodiments, the camera microphone array response may be beamformed to provide directional information to be sent in a side channel with the audio signal captured by the speakerphone microphones. For example, the camera microphone array response may be beamformed to determine whether an audio source of the audio signal is on the left side of the camera field of view or the right side of the camera field of view.

In some embodiments, on the remote or far end, the audio signals may be positioned or located in various speakers in the remote room using the directional information to essentially create a stereo signal. For example, the audio signal may be created by the speakerphone microphone array, and the side channel may contain directional information (e.g., indicating the left side). The remote conference system may then reproduce the audio from the participant on the left side of the remote participant (e.g., on speakers on the left side of the remote participant) as indicated by the directional information. In some embodiments, the side information may be multiplexed into the audio signal.

In some embodiments, the directional information may be determined by beamforming signals from microphones coupled to the conference system (e.g., integrated microphones on the camera and/or speakerphone(s)). For example, beamforming signals from the integrated microphones may indicate that the participant is speaking on the left side of the conference system (e.g., left side of the camera). The information sent with the audio signal may then indicate the audio came principally from the left side of the conference system. The audio signal may be reproduced over speakers primarily on the left side of the receiving conference system. In some embodiments, the sound may be reproduced from speakers on the conference system that are directed towards the left side of the conference system (i.e., pointed to the left). Other speaker configurations are also contemplated.

In some embodiments, the speakerphone may have a good directional beam, and by using a combination of the camera and its microphone(s), the system may establish certain beams, e.g., four beams on the left side of the room and another four beams on the right side. Thus the method may actually create stereo sound by mixing four of the left-sided beams to make a left audio channel and four of the right-sided beams to make a right audio channel. Thus, when stereo audio is being implemented, the method may achieve two channels without requiring microphones at two different locations.

In some embodiments, a true stereo echo canceller may not be required. For example, an independent echo canceller may be used for each derived talker position. In some embodiments, a true stereo echo canceller may be used. For example, a 3-channel or higher echo canceller may be used (other echo cancellers may also be used). A beamformer may be applied to the integrated microphones to generate a left and a right beam (or left, center, and right for a 3-channel echo canceller). In some embodiments, beams determined by the integrated microphones in the camera may be continuously correlated with the beams locating a participant (e.g., a participant speaking around the speakerphone). Depending on the visual field of the camera, the correct speakerphone beams may be used to produce left and right audio channels. In some embodiments, the speakerphone beamformer may generate a left and right beam (or left, center, and right beam for a 3 channel echo canceller). In some embodiments, these beams may become inputs to the left and right audio channels for the echo canceller. In some embodiments, audio beams used for the left and right audio channel coming from the speakerphone may provide better audio separation due to higher quality beams. In addition, they may eliminate the need to have two separate microphones for left and right audio channels placed in specific locations on the table. In some embodiments, audio beams may be used for left and right audio channels to provide better audio separation and eliminate the need to have two separate microphones placed on the table in front of the unit (as opposed to just left and right microphones). In some embodiments, left and right microphones may also be used.

In some embodiments, at a conferencing site with both a video conferencing system and a speakerphone, the audio for the video conference may be captured using the speakerphone microphone array.

In some embodiments, the video conference system may have an integrated video and audio conferencing system unit to manage both a speakerphone and a video conferencing system. For example, a speakerphone and a video conferencing system may be coupled to an integrated video and audio conferencing system unit and may receive/send audio and/or video signals to/from the integrated unit.

In some embodiments, an integrated video conferencing unit may include a computing system, a plurality of microphones, a camera, and a display integrated in a single housing.

BRIEF DESCRIPTION OF THE DRAWINGS

A better understanding of the present invention may be obtained when the following detailed description is considered in conjunction with the following drawings, in which.

Figure 1:
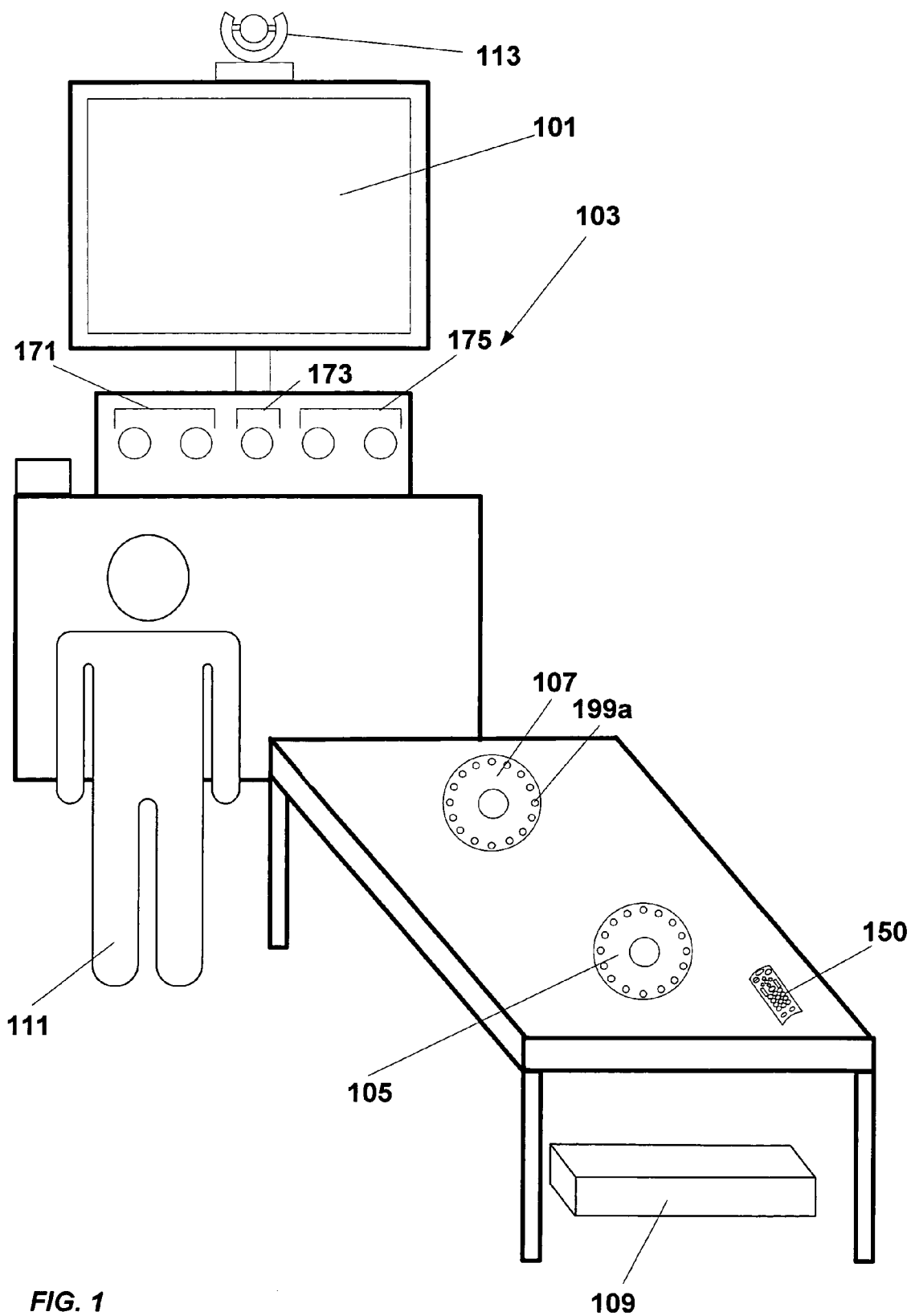
FIG. 1 illustrates a conference calling system with a video conference system and a speakerphone, according to an embodiment.
Figure 2:
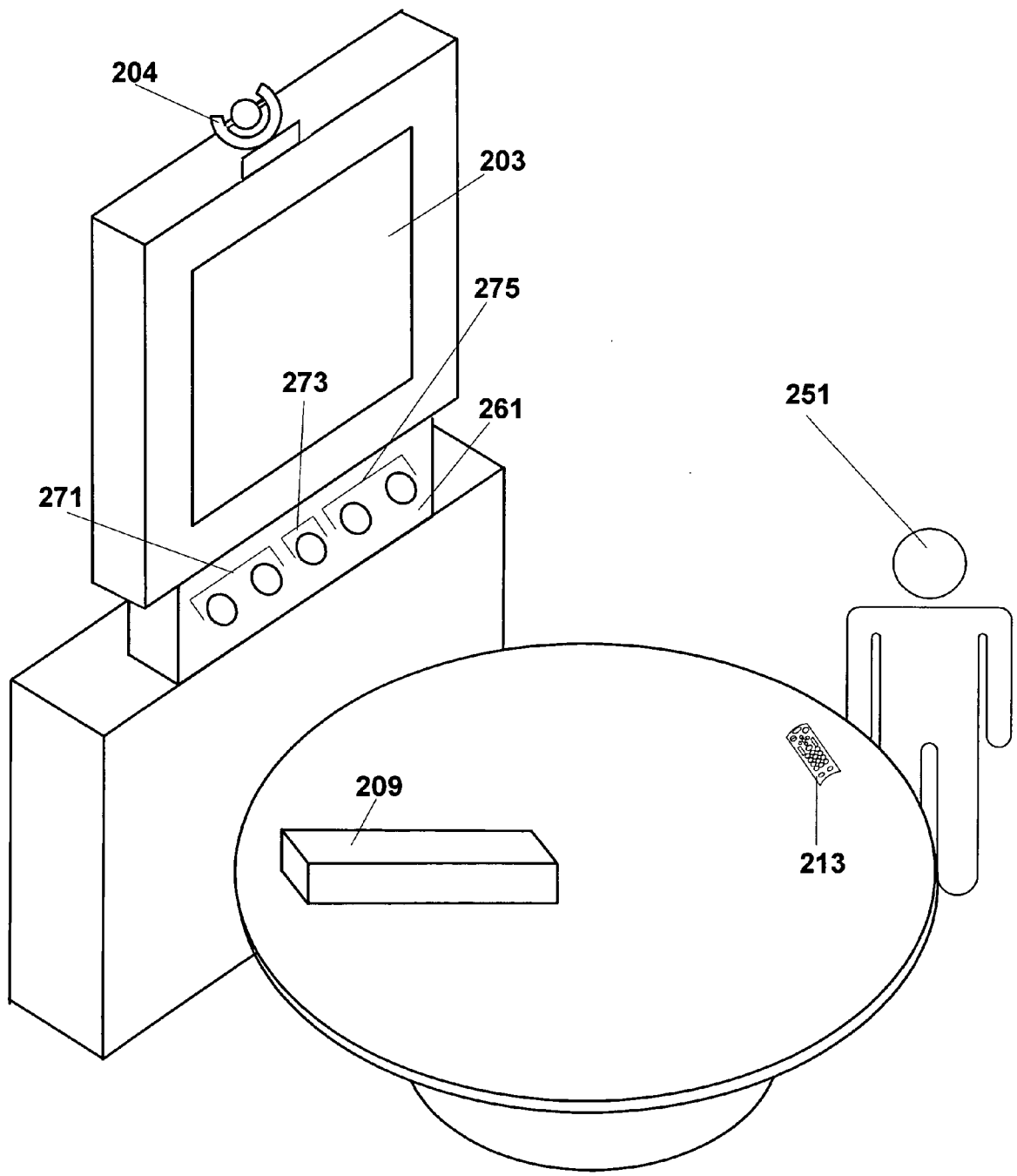
FIG. 2 illustrates a video only conference participant, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Provisional Patent Application, Ser. No. 60/619,303, titled "Speakerphone", which was filed Oct. 15, 2004, whose inventors are Michael L. Kenoyer, William V. Oxford, and Simon Dudley is hereby incorporated by reference in its entirety as though fully and completely set forth herein.

U.S. Provisional Patent Application titled "Speakerphone", Ser. No. 60/634,315 which was filed Dec. 8, 2004, whose inventors are William V. Oxford, Michael L. Kenoyer and Simon Dudley which is hereby incorporated by reference in its entirety as though fully and completely set forth herein.

U.S. Provisional Patent Application, Ser. No. 60/619,210, titled "Video Conference Call System", which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety as though fully and completely set forth herein.

U.S. Provisional Patent Application, Ser. No. 60/619,227, titled "High Definition Camera and Mount", which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety as though fully and completely set forth herein.

FIG. 1 illustrates an embodiment of a conference calling system with a video conference system and a speakerphone. In some embodiments, the video conference system may have a system device 109 (e.g., a system codec) to manage both a speakerphone 105/107 and a video conferencing system 103. For example, a speakerphone 105/107 and a video conferencing system 103 may be coupled to the system device 109 and may receive audio and/or video signals from the system device 109.

In some embodiments, spatially realistic audio may be provided for a video call. In some embodiments, voices from participants on a left side of a display, in a video call, may be directed through audio on the left side of the display (e.g., through left speakers 171) at the remote video conferencing unit (similarly for voices from the center (center speaker 173) and right side (right speakers 175) of the display). This may result in giving the participant a realistic audio experience that may match the realism of the video experience.

In some embodiments, two speakers may be used in the system to create synthesized stereo sound at a location specified by directional information received as side information along with the existing audio channel. In some embodiments, the side information may be multiplexed into the audio signal.

In some embodiments, an audio signal may be captured by a speakerphone, and microphone responses (e.g., from microphones in a camera) may be beamformed to provide directional information for the audio signal. The audio signal may be sent along with the directional information to another conferencing system to recreate the audio using the directional information to create the effect of stereo using only monochannel audio and the directional information. In some embodiments, other audio signals may be used (e.g., non-mono). In some embodiments, the beams from the camera microphone responses may be cross-correlated with the beams from the speakerphone microphones to improve the directional information. The speakerphone may also perform beamforming to steer a beam at the talking participant to improve the audio quality of the audio signal. When the audio signal and directional information are received by another video conferencing system, the audio may be reproduced in the video conferencing system's speakers according to the directional information. For example, if the participant is on the right side of the camera of the originating conference room, the audio may be reproduced on the right side of the room in the receiving conference room. The directional information may indicate which speakers (or combination of speakers in the receiving conference room to place the audio signal).

Figure 4:
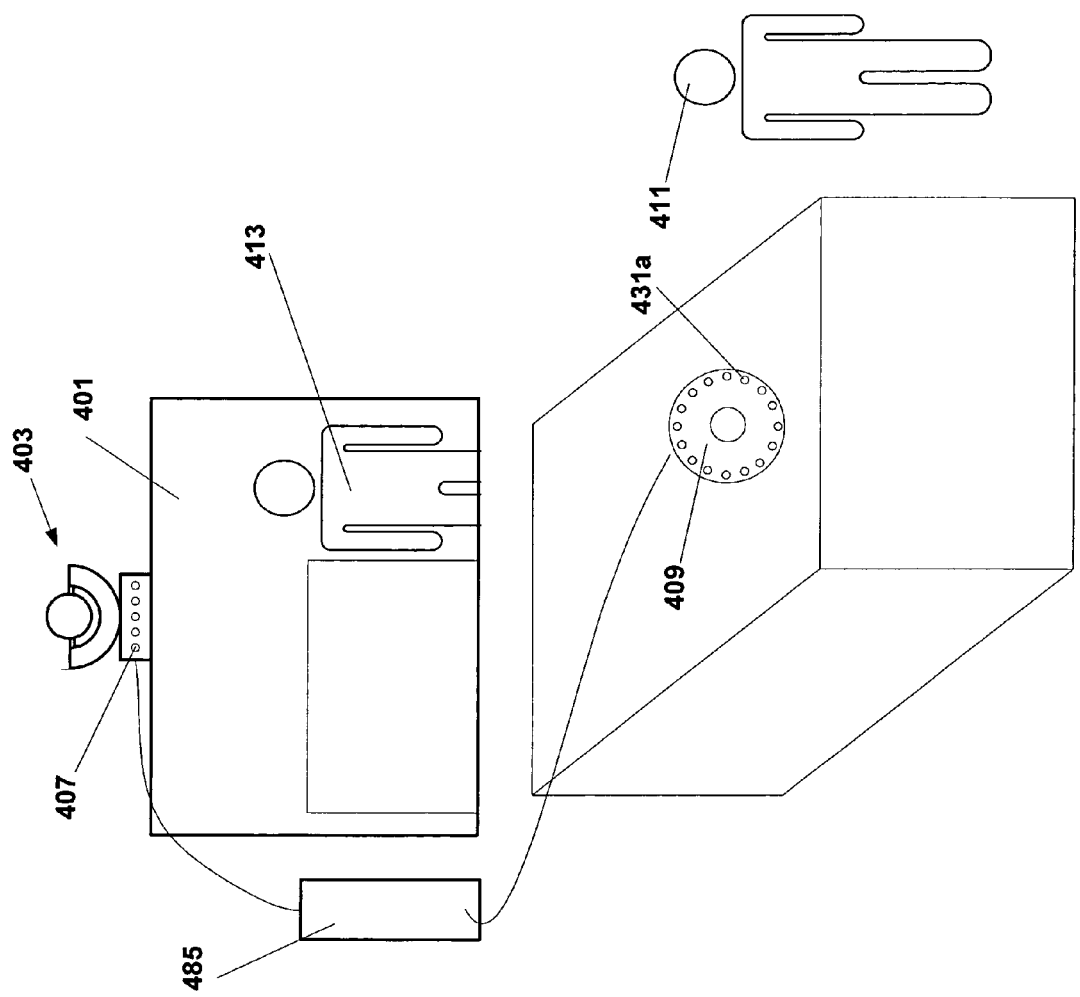
FIG. 4 illustrates a local video conference site, according to an embodiment.

FIG. 4 illustrates an embodiment of a local video conference site. In various embodiments, the videoconferencing system at a first location may provide stereo audio to a remote videoconferencing system by using microphones on a speakerphone 409 and a camera 403. In some embodiments, an audio signal may be captured by speakerphone microphones 431. In some embodiments, the camera microphone array response may be beamformed to provide directional information to be sent in a side channel with the audio signal generated by the speakerphone microphones 431. For example, the camera microphone array response may be beamformed to determine whether an audio source of the audio signal is on the left side of the camera field of view or the right side of the camera field of view. If a participant 411 is speaking on a left side of the camera 403, beamforming the camera microphone array 407 may result in a determination that the participant 411 is on the left side (e.g., after forming at least two beams from the microphone array response, a left side beam may have more energy than the right side beam). Thus the method may use the camera microphone array 407 and the camera 403 to set a known reference and use beamforming to decide where the participant is from a horizontal field of view perspective relative to the camera 403. The directional information generated by beamforming the camera microphone array response may be sent in a side channel parallel to the speakerphone generated audio signal to a remote conference system.

In some embodiments, the audio signal generated by the speakerphone microphones may be generated by beamforming the response from an array of speakerphone microphones. For example, several beams may be formed from the speakerphone microphone array and one or more beam responses may be selected and sent for reproduction at the remote conference system.

Figure 5:
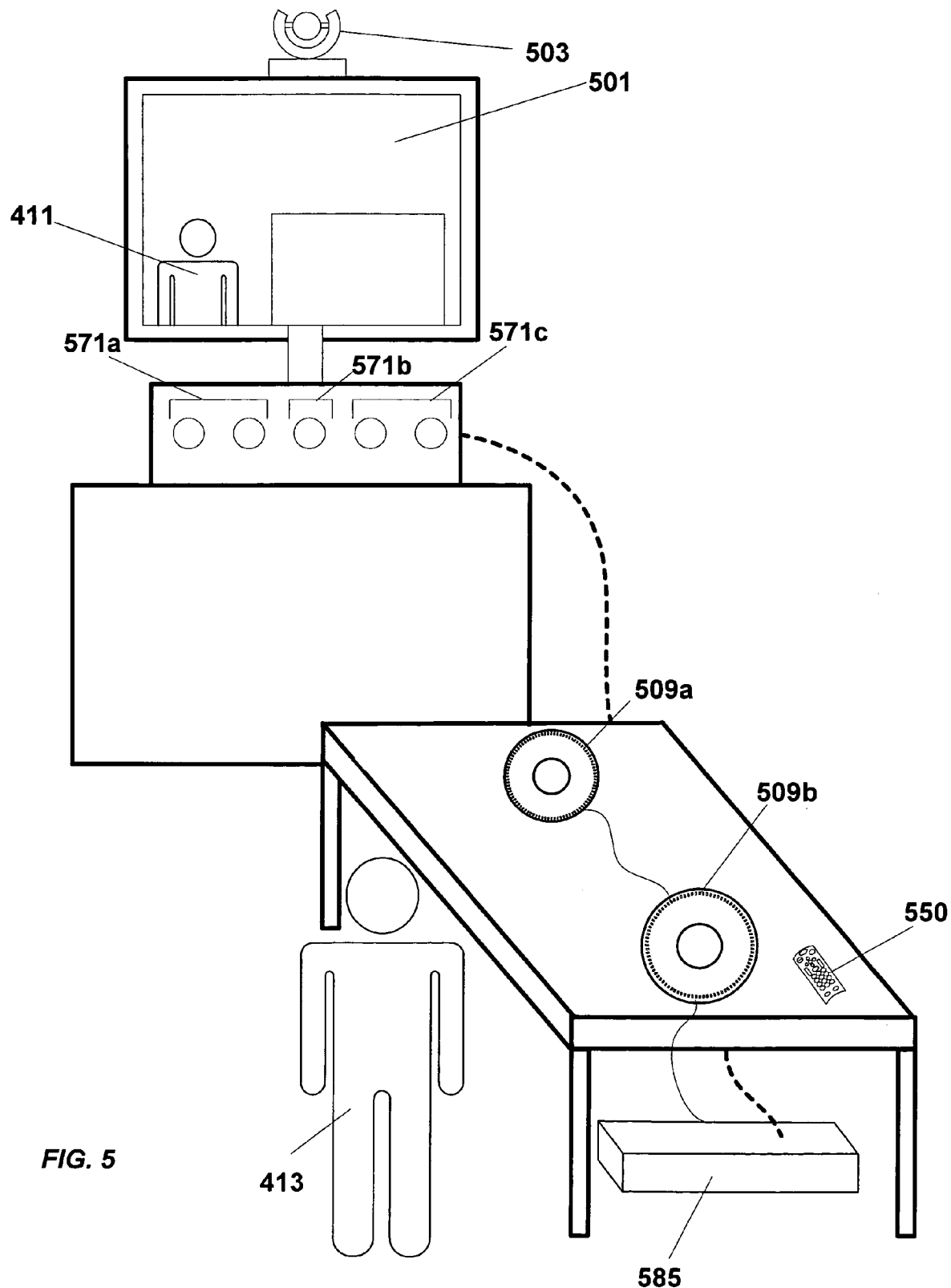
FIG. 5 illustrates a remote conference site, according to an embodiment.

FIG. 5 illustrates an embodiment of a remote conference site. In some embodiments, on the remote or far end, the audio signals may be placed in various speakers 571 in the remote room using the directional information to essentially create a derived stereo signal. For example, the audio signal may be created by the speakerphone microphone array 431, and the side channel may contain directional information (e.g., indicating the left side). The remote conference site may then reproduce the audio from the participant 411 on the left side of the remote participant 413 (e.g., on speakers 571a on the left side of the remote participant 413). In some embodiments, circuitry (including at least one processor) in the system device (e.g., system control box 585) may control which speaker the audio is reproduced through by utilizing the side channel information.

In some embodiments, the speakerphone 409 may provide a good directional beam, and by using a combination of the camera 403 and its microphone array 407, the system may establish certain beams, e.g., four beams on the left side of the room and another four beams on the right side. Thus the method can actually create stereo sound by mixing four of the left-sided beams to make the left audio channel and four of the right-sided beams to make the right audio channel. Thus, when stereo audio is being implemented, the method can achieve two channels without requiring different microphones on the left and right side of the room.

In some embodiments, the microphone response from the speakerphone may be calibrated with the response from the camera microphones. For example, when a participant is speaking on the left side of the camera, the speakerphone may steer several beams, and the beams with the strongest response may be identified with the left side of the camera. The left side beams of the speakerphone may be sent along as a left side signal and the right side beams may be sent along as a right side signal. In some embodiments, "left side" and "right side" may be determined by cross correlating the beamformed speakerphone microphone responses with the beamformed camera microphone responses. In addition, other beams may be formed and directed to various speakers around the remote conference site. For example, a front-right beam of the speakerphone may be placed on a front right speaker at a remote conference site (e.g., as indicated in a side channel). In some embodiments, the audio signal may be placed in multiple speakers at proportionate levels as indicated by directional information (e.g., stronger in the left side speakers than the right side speakers if the directional information indicates the audio source is primarily on the left side of the system) or by introducing delays and/or phase shifts frequency adjustments (such as those used for HRTF (head-related transfer function)) to position the sound to a participants hearing at the intended location.

In some embodiments, multiple cameras and multiple speakerphones may work together. For example, better directional data may be determined using two camera microphone arrays. In addition, better sound capture and/or better steered audio signal beams may be generated using two cooperating speakerphones (e.g., a processor processing responses from the separate speakerphone microphone arrays as if they were one large array).

Figure 6:
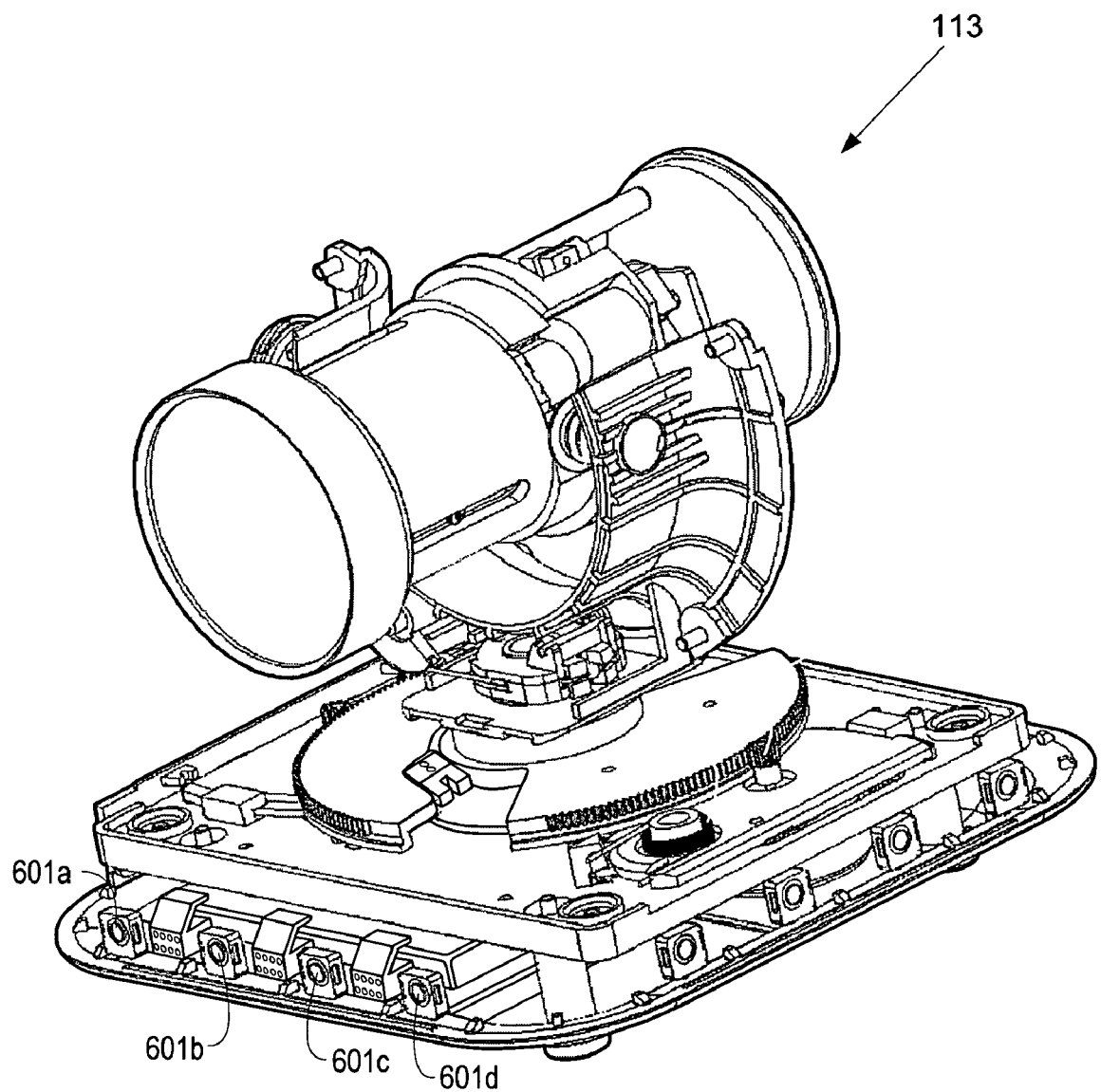
FIG. 6 illustrates a camera with integrated microphones, according to an embodiment.

As seen in FIG. 6, the directional information may be determined by using beam forming with integrated microphones 601 on the camera 113 (an internal view of the camera 113 is shown in FIG. 6). For example, beamforming signals from the integrated microphones 601 may indicate that the participant is speaking on the left side of the conference system. The audio signal may then be reproduced over speakers primarily on the left side of the conference system (e.g., left speakers 171). In some embodiments, the sound may be produced from speakers on the system that are directed towards the left side of the system (i.e., pointed to the left). Other speaker configurations are also contemplated. Other numbers and locations of the integrated microphones 601 may also be used. In some embodiments, microphones in the speakerphone coupled to the conference system may be used to detect a relative location of the participant (e.g., when cross correlated with known direction beams such as beams from a camera microphone array).

In some embodiments, a true stereo echo canceller may not be required. For example, an independent echo canceller may be used for each derived talker position. In some embodiments, five synthesized talker locations may be used across the display (other numbers of synthesized talker locations may also be used). Each may be on or off resulting in a 32 collective derived talker positions and 32 independent echo cancellers. Other numbers of collective derived talker positions and independent echo cancellers may be used. When a set of talker positions is active, a corresponding echo canceller may be activated. In some embodiments, because only one echo canceller may be executing at any one time, the compute requirements of the system may be minimized.

In some embodiments, a true stereo echo canceller may be used. For example, a 3-channel or higher echo canceller may be used (a lower channel echo canceller may also be used). A beamformer may be applied to the integrated microphones 401 to generate a left and a right beam (or left, center, and right for a 3-channel echo canceller). The beams may become inputs to the left and right audio channels of the echo canceller. In some embodiments, beams determined by the integrated microphones 601 in the camera 113 may be continuously correlated with the beams locating the participant around the speakerphone. Depending on the visual field of the camera 113, the correct speakerphone beams may be used to produce left and right audio channels. In some embodiments, the speakerphone beamformer may generate a left and right beam (or left, center, and right beam for a 3 channel echo canceller). In some embodiments, these beams may become inputs to the left and right audio channels for the echo canceller. In some embodiments, audio beams used for the left and right audio channel coming from the speakerphone may provide better audio separation due to the high quality beams. In addition, they may eliminate the need to have two separate microphones for left and right audio channels placed in specific locations on the table. In some embodiments, audio beams may be used for left and right audio channels to provide better audio separation and eliminate the need to have two separate microphones placed on the table in front of the unit (as opposed to just left and right microphones). In some embodiments, left and right microphones may also be used.

In various embodiments, external call data may be received by a system device 109 (e.g., a system codec) which may include a computing system (e.g., including a processor, memory, etc.). The system device 109 may send audio from audio-only participants through the speakerphone and may send video and audio from video participants to the video conferencing system. In some embodiments, the system codec 109 may read information sent with the audio signal to determine which speakers 171/173/175 to send the audio through. In some embodiments, the system device 109 may also beamform audio from the local participants to detect a relative location of the participants relative to the conference system. The detected directional information may be sent with the audio signal to the other conference systems.

In some embodiments, the conference system may use two high quality long travel 1-inch diameter ported speakers with a frequency response of approximately 150 Hz to 22 kHz. Other speakers may also be used. In some embodiments, low noise microphones may be used at positions supporting either broad-fire or end-fire microphone array processing. In some embodiments, approximately 8 low noise microphones may be used (other numbers of microphones are also contemplated). The microphones may detect audio from a participant (who may typically be approximately 3' to 5' from the system). Audio algorithms may direct the microphone array at the participant speaking and minimize background noise and reverberation. Additional beamforming algorithms may be used to determine the horizontal angle of the participant with respect to the system.

In some embodiments, at a conferencing site with both a video conferencing system and a speakerphone, the audio from the local video conference participants may be captured from the local speakerphone microphone array 199. In some embodiments, if capturing the audio from the local video conference through the speakerphone microphone array 199, microphones with improved frequency response (e.g., in a range of approximately 7 kHz to 22 kHz) may be used. Other frequency responses are also contemplated. For example, 22 kHz microphones in the speakerphone may capture a good audio signal for the video conference participants to send to remote conference sites. Other microphones are also contemplated. The speakerphone may also perform beamforming to steer a beam at the talking participant to improve the audio quality of the audio signal for the video conference.

Figure 7:
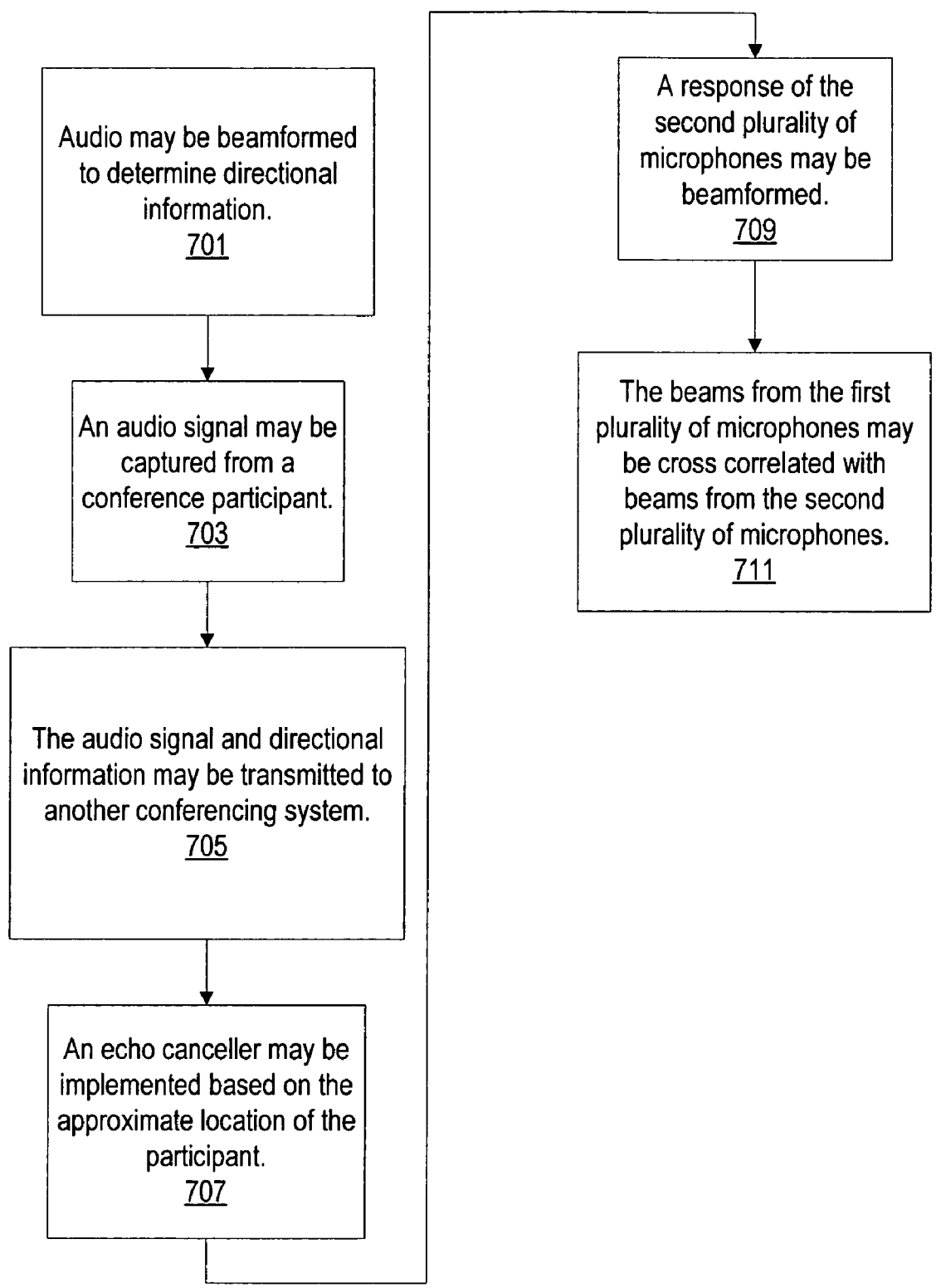
FIG. 7 illustrates a method for spatially reproducing the audio from other conference systems, according to an embodiment.

FIG. 7 illustrates an embodiment of a method for spatially reproducing the audio from other conference systems. It is noted that in various embodiments one or more of the method elements may be performed concurrently, in a different order, or be omitted. Additional elements may be performed as desired.

At 701, audio from a conference participant may be beamformed using a first plurality of microphones to determine directional information (e.g., relative direction) of the participant relative to the microphones. The position of the microphones relative to the conference system may be known, and therefore, the approximate location of the participant relative to the conference system may be determined.

At 703, an audio signal may be captured from a conference participant. For example, a plurality of microphones may capture the audio signal based on detected audio from the participant.

At 705, the audio signal and directional information may be transmitted to another conferencing system.

At 707, an echo canceller may be implemented based on the approximate location of the participant. In some embodiments, the echo canceller may be an independent echo canceller picked from a plurality of independent echo cancellers. In some embodiments, the specific independent echo canceller used may be based on the approximate location of the participant.

At 709, a response of the second plurality of microphones may be beamformed.

At 711, the beams from the first plurality of microphones may be cross correlated with beams from the second plurality of microphones.

In some embodiments, the audio signal and the directional information may be used together to reproduce the audio from the participant at the remote conference system. In some embodiments, a second set of beams may be cross correlated with the initial beamformed beams to create improved directional information.

Figure 8:
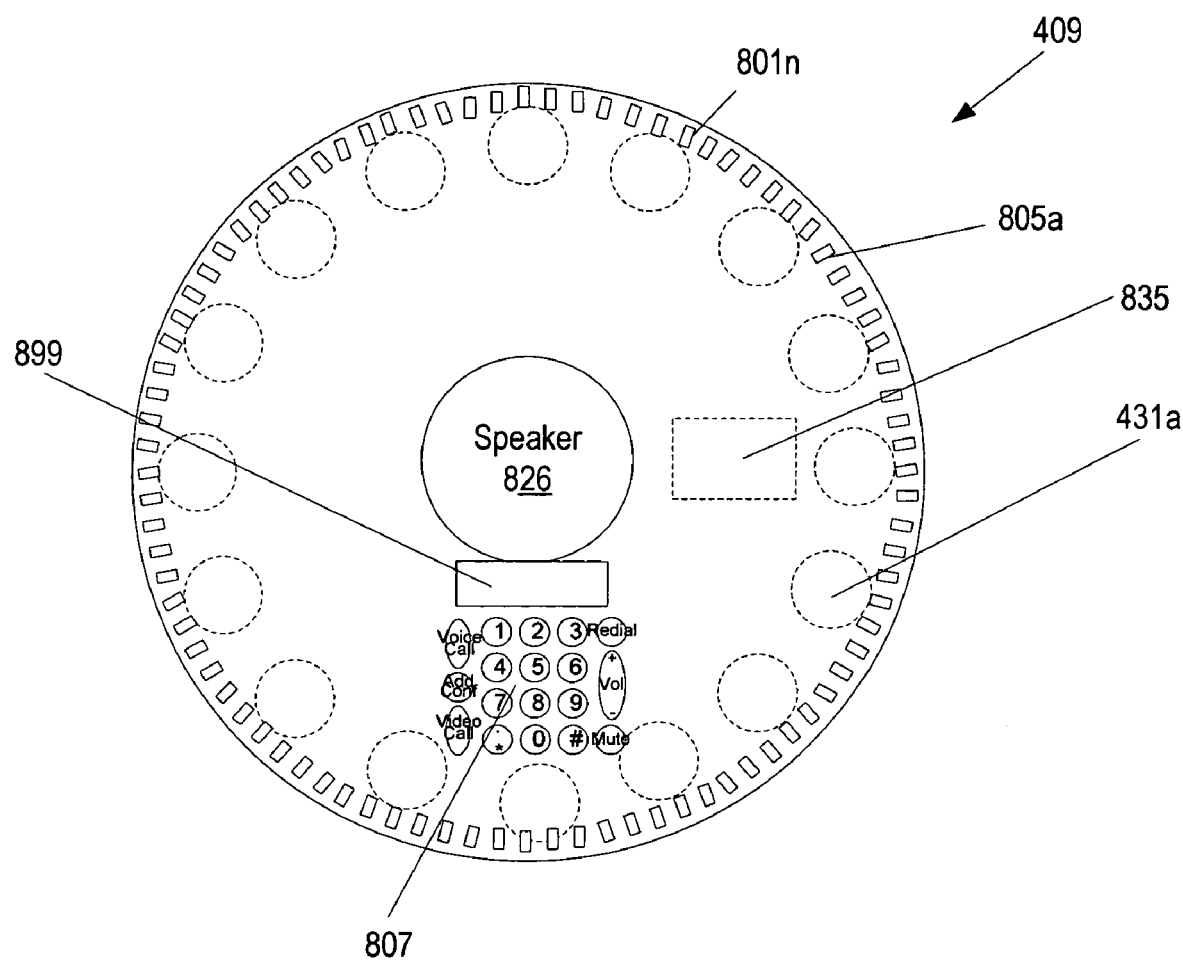
FIG. 8 illustrates a speakerphone, according to an embodiment.

FIG. 8 illustrates an embodiment of a speakerphone. In some embodiments, a speakerphone 409 may have a center speaker 826 and multiple microphones 431, which may circle the outer perimeter of the speakerphone 409. The center speaker 826 may assist in providing sound from remote participants, while the microphones 431 may capture sound from in-room participants. In some embodiments, sixteen microphones 431 may be radially distributed around the center speaker 826. Other numbers of microphones and speakers may also be used. The microphones 431 may be radially distributed to enhance detection of an in-room speaker's voice from multiple angles relative to the speakerphone 409. While a circular arrangement for the microphones 431 is shown, other arrangements may also be used. The microphones 431 and speakers 826 may also be arranged differently. In some embodiments, a control logic 835 may control the speaker 826, microphones 431, and other various functions of the speakerphone 409. In some embodiments, the speakerphone 409 may communicate with a system device 109 through an Ethernet cable (other transmission mediums are also contemplated).

In some embodiments, spatial audio may be provided by using a single mono channel directed by side information so that the single mono audio signal is positioned in the correct place, e.g., as determined by the camera. This method may also be performed without a camera. In some embodiments, calibration may be used to determine which beams are being generated on the left side of the room and which beams are being generated on the right side of the room. By combining this method with use of the camera, (e.g., by detecting a position of the speaker relative to the camera (or the relative position of the speaker in the room)), the position of the speaker or other participants can be determined without having the participant set up the speakerphone in any special way and/or without requiring any calibration. The camera and associated image processing can thus be used to determine which beams on left side of the camera's field of view and which beams are on the right side of the camera's field of view.

This method does not require a participant to have knowledge or prior information regarding which beams correspond to the left side and which beams correspond to the right side. Depending on where the camera is pointed, a situation could arise where only one beam is generated on the left side and all the rest of the beams are generated on the right side.

Figure 9:
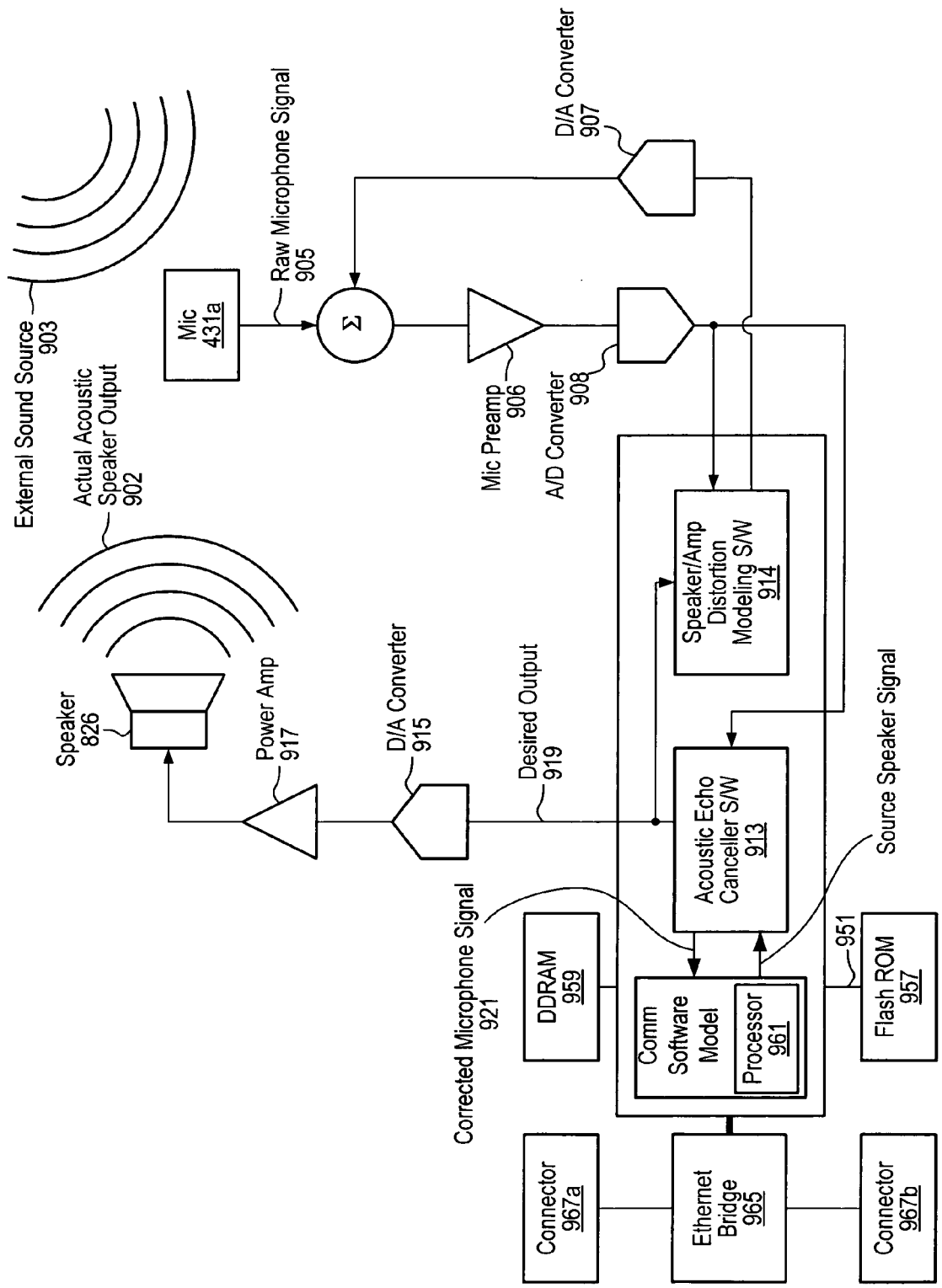
FIG. 9 illustrates a circuitry diagram of the speakerphone, according to an embodiment.

FIG. 9 illustrates an embodiment of a circuitry diagram of the speakerphone (i.e., the control logic 835). In some embodiments, a processor 961, such as a Phillips Nexperia™ (PNX) 1500 Digital Signal Processing (DSP), may control various components of the speakerphone 409. The processor 961 may be coupled to a memory such as a flash memory 957 and a double data random access memory (DDRAM) 959. Other memories and memory types may also be used. In some embodiments, the processor 961 may be coupled to components (e.g., flash memory 957) through a peripheral component interconnect (PCI) interface 951. The speakerphone 409 may include various connectors 967 to connect the speakerphone 409 to a network, such as an Ethernet, through an Ethernet bridge 965. Other networks are also contemplated. In some embodiments, connectors 967 may be used to daisy chain additional speakerphones. For example, multiple speakerphones (such as 509*a* and 509*b* in FIG. 5) may be used in a large conference room.

Figure 10:
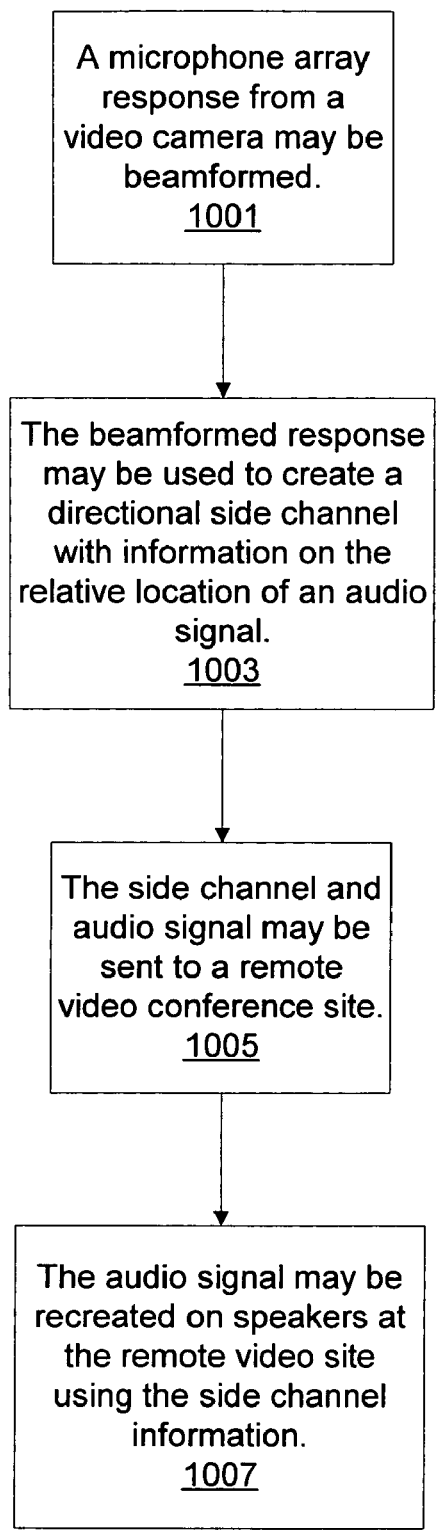
FIG. 10 illustrates a method for generation of a stereo signal, according to an embodiment.

FIG. 10 illustrates an embodiment of a method for generation of a stereo signal. It should be noted that in various embodiments of the methods described below, one or more of the elements described may be performed concurrently, in a different order than shown, or may be omitted entirely. Other additional elements may also be performed as desired.

At 1001, a microphone array response from a video camera may be beamformed.

At 1003, the beamformed response may be used to create a directional side channel with information on the relative location of an audio signal. In some embodiments, the audio signal may be generated from a microphone array on a speakerphone.

At 1005, the side channel (with directional information) and audio signal may be sent to a remote system (e.g., a remote video conference system).

At 1007, the audio signal may be sent to speakers at the remote video site using the side channel information to place the audio signal at speaker(s) respective to the information provided in the side channel. For example, if the side channel information indicates the source of audio (e.g., a participant's voice) was on the left side of the system, the audio signal may be reproduced on a left side speaker.

Figure 11:
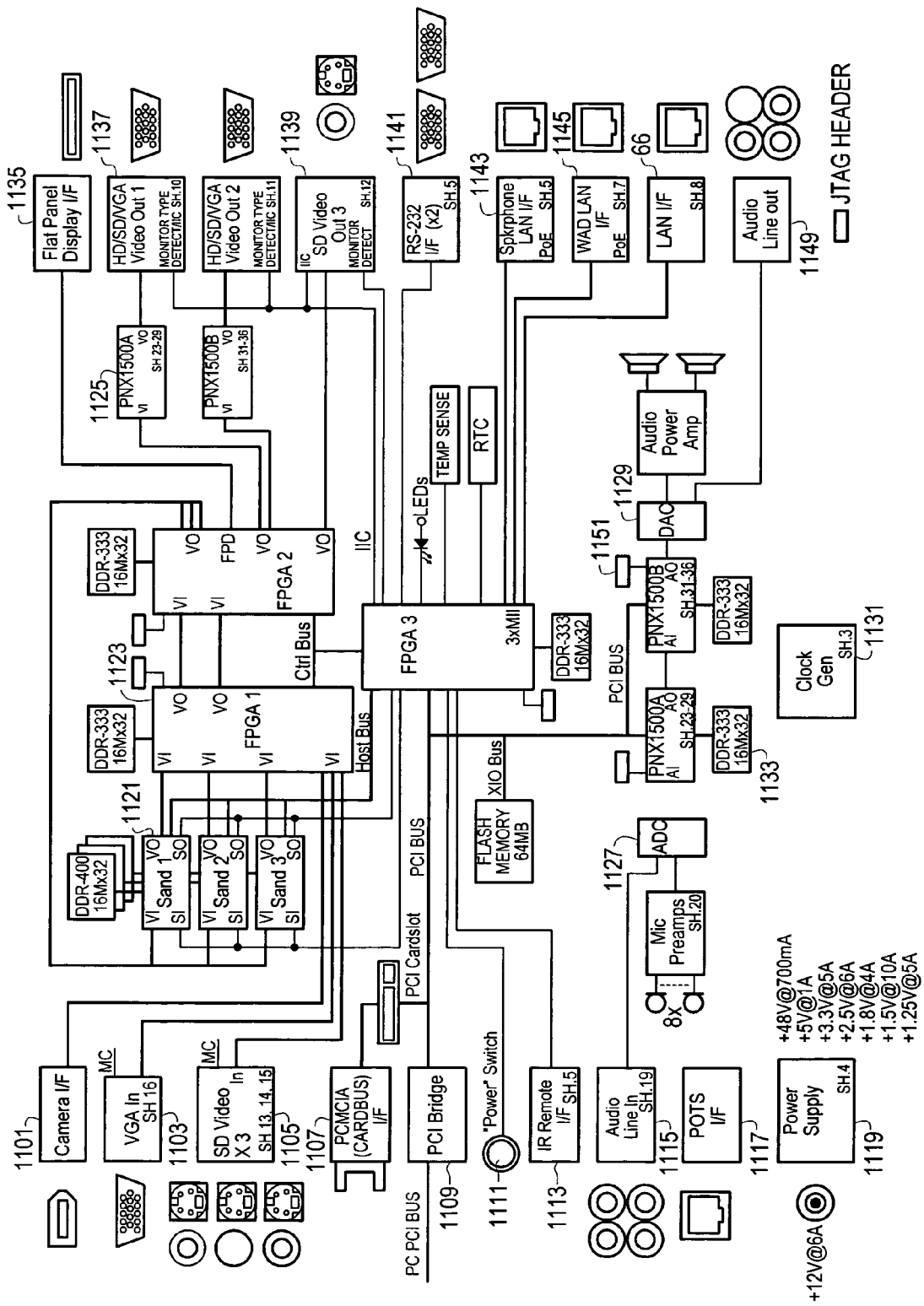
FIG. 11 illustrates a circuit diagram of a video conferencing and speakerphone unit, according to an embodiment.

FIG. 11 illustrates a circuit diagram of a video conferencing and speakerphone unit, according to an embodiment. In some embodiments, inputs to the circuit may include a camera interface 1101, a video graphics adapter (VGA) input 1103, a standard video (SD) input (e.g., 3 separate SD inputs) 1105, a Personal Computer Memory Card International Association (PCMCIA) Card interface 1107, a Peripheral Component Interconnect (PCI) bridge 1109, a power switch 1111, an infrared (IR) remote interface 1113, an audio line in 1115, a Plain Old Telephone Service (POTS) interface 1117, and a power supply 1119. As shown, the signals from these interfaces and inputs may be modified using Sands 1121, Field Programmable Gate Array (FPGA) 1123, and other processors (e.g., Phillips Nexperia 1500™ (PNX 1500) 1125). In addition, analog to digital 1127 and digital to analog converters 1129, clocks 1131 (e.g., real time clock and clock generator), and memory 1164 (e.g., double data rate (DDR), flash memory, etc) may also be used. In some embodiments, outputs may include a flat panel display interface 1166, an HD/SDIVGA (high definition/standard definition/video graphics array) video out 1168 (e.g., multiple video outs), an SD video out 1170, an RS-232 port 1172, a speakerphone local area network (LAN) interface 1174, a Wide Area Network (WAN) Access Device (WAD) LAN interface 1176, a LAN interface 66, and an audio line out 1149. Other inputs and outputs are also contemplated. Joint Test Action Group (JTAG) 1151 may also be used.

Figure 12:
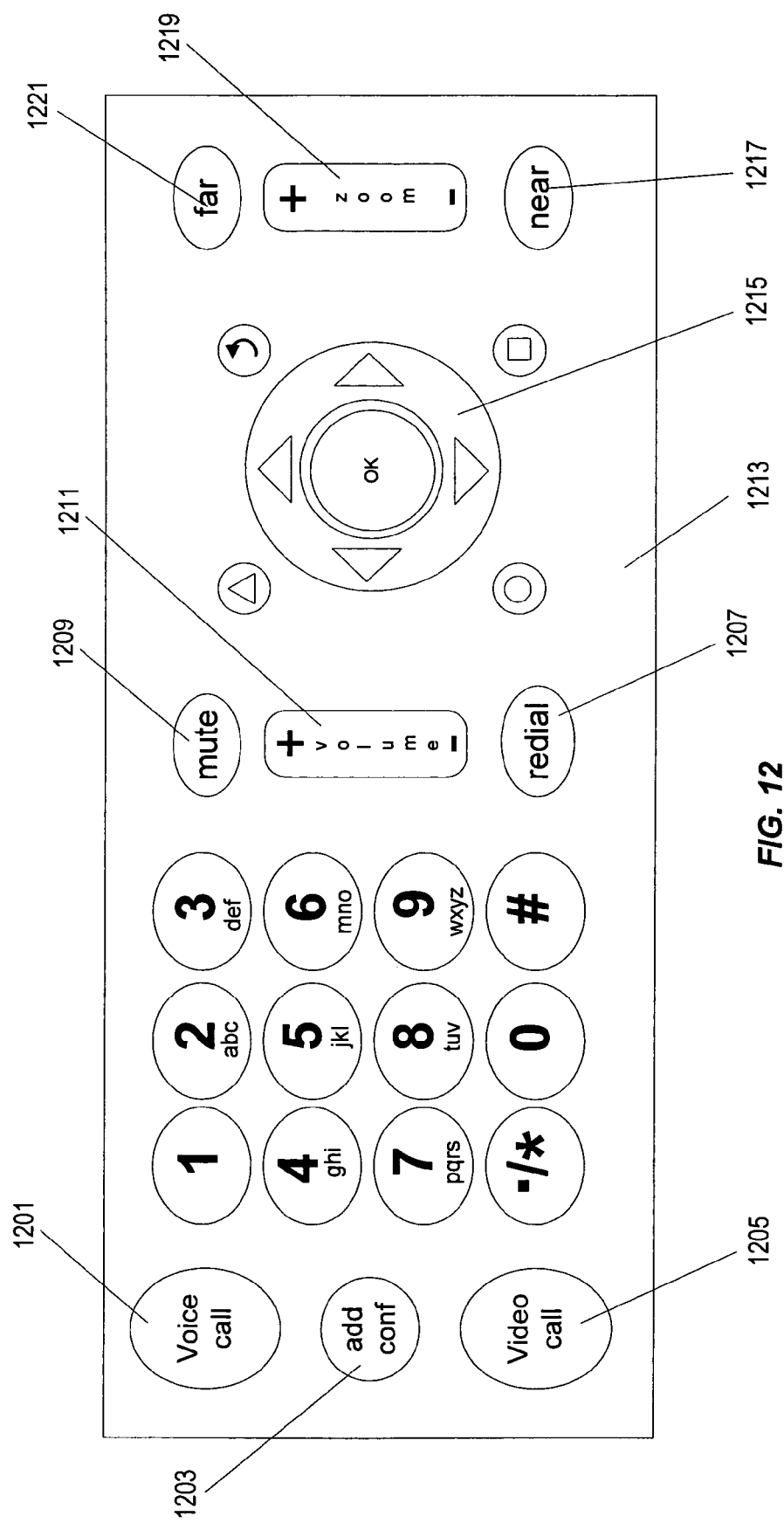
FIG. 12 illustrates an integrated unit key pad, according to an embodiment.

FIG. 12 illustrates an embodiment of a keypad for an integrated video conferencing and speakerphone unit. The keypad may have keys for configuring the video conference and speakerphone unit. For example, a voice call can be initiated with the voice call button 1201 (for the speakerphone) followed by dialing the number on the keypad. A video call may be placed by pressing the video call button 1205 and dialing the number on the keypad. Other buttons are also provided for use in both a video conference or an audio conference (e.g., add participant button 1203, mute 1209, volume 1211, and redial 1207). An arrow selector 1215 may be used to select option on a video screen for the video call or options on a speakerphone display. In some embodiments, the camera may be controlled with keys 1221 (control a far camera), 1217 (control a near camera) and zoom 1219.

Figure 13:
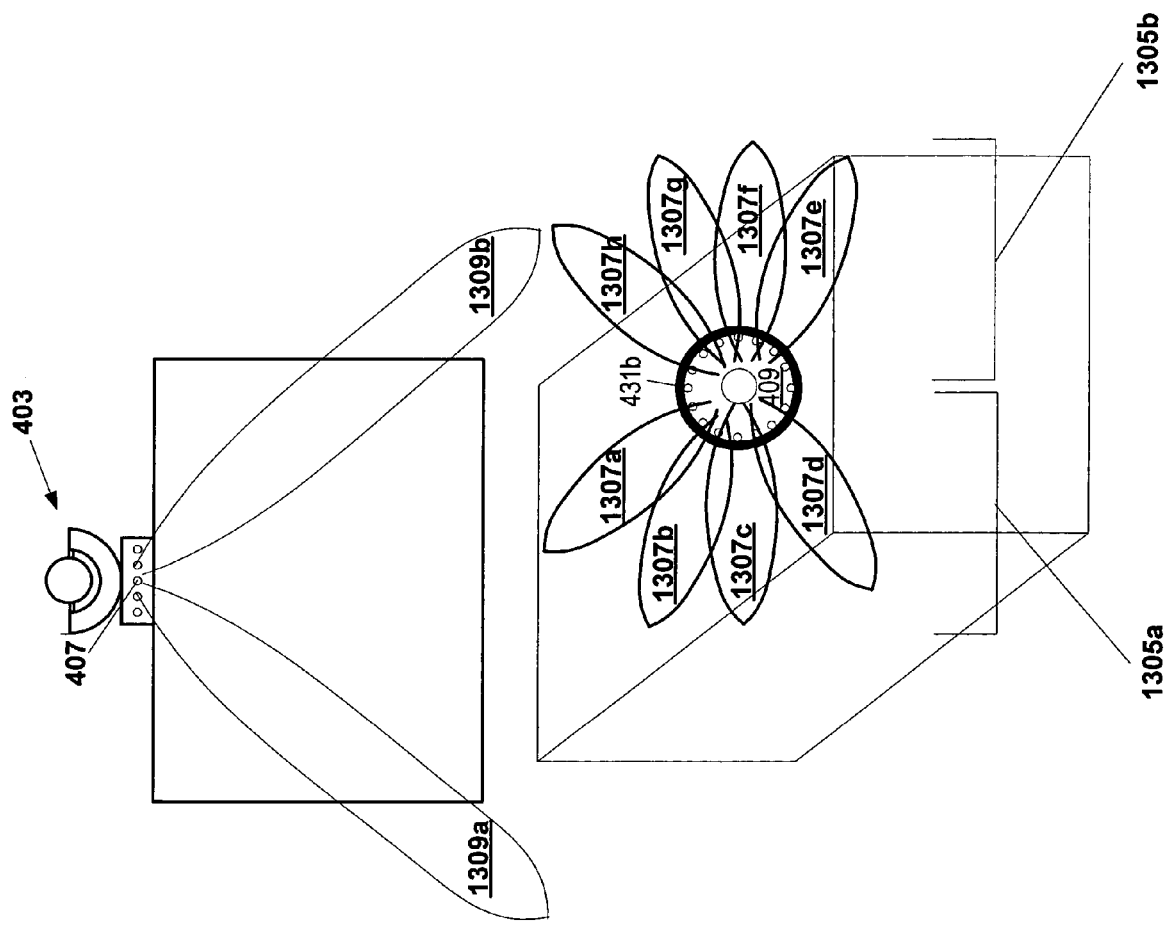
FIG. 13 illustrates speakerphone and camera beams used in creating directional side information and/or a derived stereo signal(s), according to an embodiment.

FIG. 13 illustrates an embodiment of speakerphone 409 and camera 403 beams used in creating directional side information and/or a derived stereo signal. In some embodiments, the camera microphone array 407 response may be beamformed to form left beams 1309*a* and right beams 1309*b*. In addition, the speakerphone microphone array 431 response may be beamformed to form left beams 1305*a* (e.g., beams 1307*a,b,c,d*) and right beams 1305*b* (e.g., beams 1307*e,f,g, h*). Other number of beams are also contemplated for the camera 403 and speakerphone 409.

In some embodiments, the speakerphone beams may be cross correlated with the camera beams to determine which speakerphone beams are on the left side of the camera 403 and which speakerphone beams are on the right side of the camera 403. For example, when a participant speaks on the left side of the camera 403, camera beam 1309a may have a stronger response than camera beam 1309b. If speakerphone beam 1307b has a stronger response than the rest of the speakerphone beams, the system may determine that speakerphone beam 1307b is on the left side of the camera 403. When additional participants around the speakerphone 409 speak, over time a model may be determined that represents which speakerphone beams are on the left side and which speakerphone beams are on the right side of the camera 403. In some embodiments, the model may be continuously calibrated (e.g., in case the speakerphone is moved). In some embodiments, the speakerphone may be periodically calibrated (or only calibrated once). Other calibration frequencies are also contemplated. In some embodiments, instead of waiting for participants to speak, the speakerphone 409 may emit a sound pulse and the beam response of the camera may be used to help determine the approximate location and/or orientation of the speakerphone 409 with respect to the camera 403. In some embodiments, the camera may emit the sound pulse.

In some embodiments, information from the model may be used to create side directional information to send with audio signal to a remote conference site. For example, if beam 1307b receives the strongest response when a participant speaks, the audio signal from beam 1307b may be sent along with side information indicating the beam is from the left side of the system. The remote conference site may then reproduce the audio signal on left side speakers. In addition to indicating the left side, additional information on the amount (or intensity) may be sent. For example, if beam 1307b is sent, additional side information may be sent indicating a higher intensity left side beam than if beam 1307d (which is closer to the center) was being sent. If beam 1307d was sent to the remote site, the remote site may produce beam 1307d on the left speakers at a softer intensity (as indicated by side information with the audio signal) than if beam 1307b were received. The remote system may also distribute some of the audio to the right side to give a more centric audio feel. In some embodiments, additional beams may be sent simultaneously with side information indicating their respective positions to be reproduced by the remote conference site. In some embodiments, imaging techniques may be used to determine if the participant is speaking on the left side or right side of the camera 403 (e.g., if the camera 403 does not have a microphone array 407).

In some embodiments, instead of (or in addition to) sending side information, a derived stereo signal may be sent (which may include, for example, sending a left audio channel and a right audio channel to the remote conference site). In some embodiments, the left audio channel may be formed from beam responses on the left side of the speakerphone 409 and the right audio channel may be formed from beam responses on the right side of the speakerphone 409. In some embodiments, the beams may be combined to form respective left audio channels and right audio channels. The intensity of the respective channels may be determined based on which beam has the strongest response as discussed above. Other methods for creating the derived stereo response including intensity of channel, delay, phase changes, frequency, and head related transfer function may be used on the local or remote side in creating or producing the derived stereo signals (combinations of these methods may also be used). Other methods are also contemplated.

Figure 14:
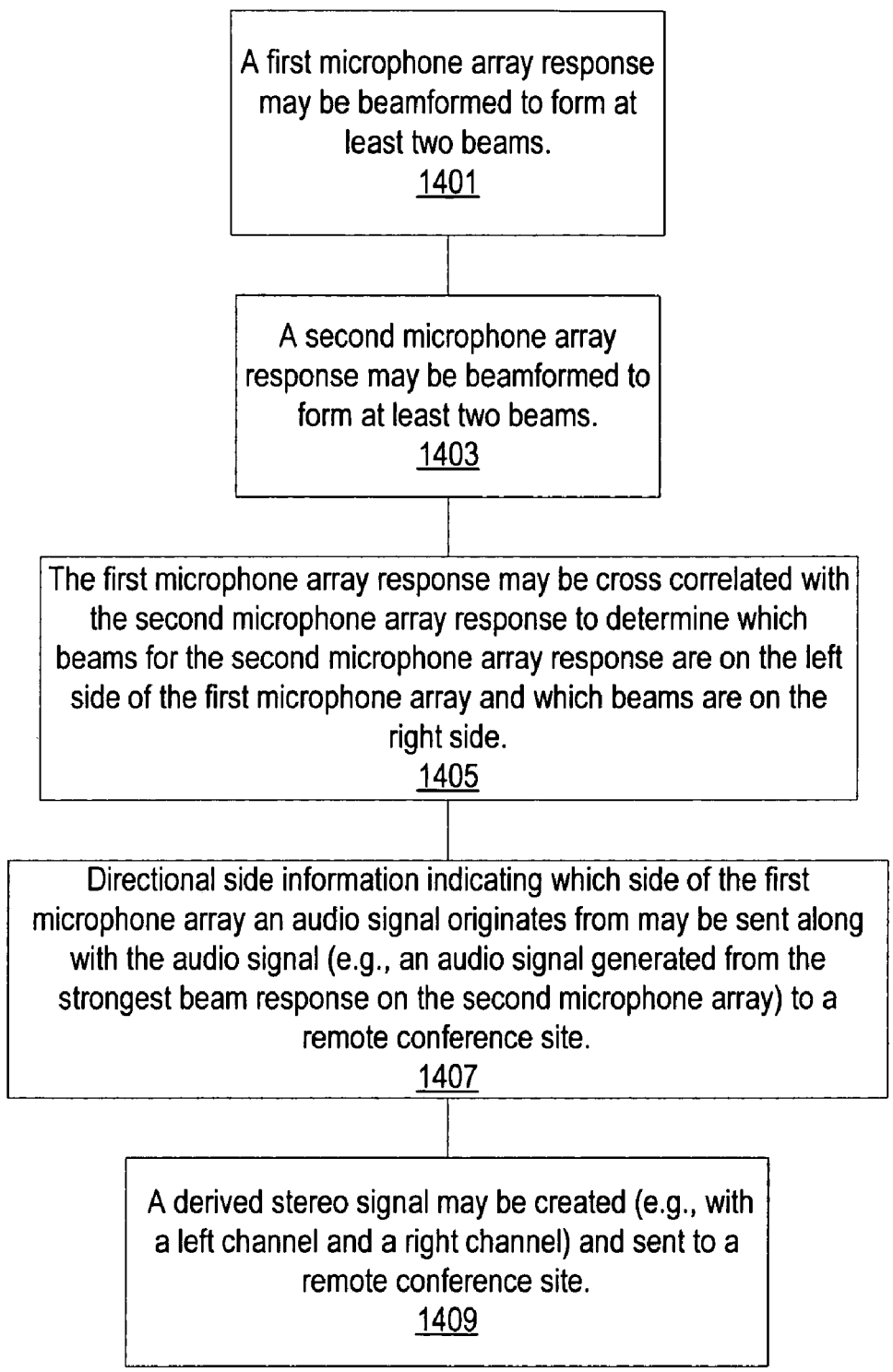
FIG. 14 illustrates a method for cross correlating speakerphone beams and camera beams, according to an embodiment.

FIG. 14 illustrates an embodiment of a method for cross correlating speakerphone beams and camera beams. It should be noted that in various embodiments of the methods described below, one or more of the elements described may be performed concurrently, in a different order than shown, or may be omitted entirely. Other additional elements may also be performed as desired.

At 1401, a first microphone array response may be beamformed to form at least two beams. For example, a camera microphone array response may be beamformed to form left side and a right side beams At 1403, a second microphone array response may be beamformed to form at least two beams. For example, a speakerphone microphone array response may be beamformed to form left side beams and right side beams. In addition, central beams may also be formed for the first microphone array and the second microphone array.

At 1405, the first microphone array response may be cross correlated with the second microphone array response to determine which beams for the second microphone array response are on the left side of the first microphone array and which beams are on the right side.

At 1407, directional side information indicating which side of the first microphone array an audio signal originates from may be sent along with the audio signal (e.g., an audio signal generated from the strongest beam response on the second microphone array) to remote conference site. In some embodiments, the directional side information may indicate both a side (e.g., left side) and a relative intensity (e.g,. intensity may be higher for a direct left beam and lower for a more central beam). Other side information may also be sent.

At 1409, a derived stereo signal may be created (e.g., with a left audio channel and a right audio channel) and sent to a remote conference site. In some embodiments, the left audio channel may be formed from beam responses on the left side of the second microphone array and the right audio channel may be formed from beam responses on the right side of the second microphone array. The intensity of the respective channels may be determined based on which beam has the strongest response as discussed above. In addition, multiple beams may be used to form the left and right audio channel by combining the beams using their relative intensities (e.g., as determined by their relative position to the second microphone array.) In some embodiments, the derived stereo signal may be created as the directional side information and audio signal (i.e., the derived stereo signal may effectively be an audio signal including directional side information in the form of left audio channel and right audio channel).

Figure 15A:
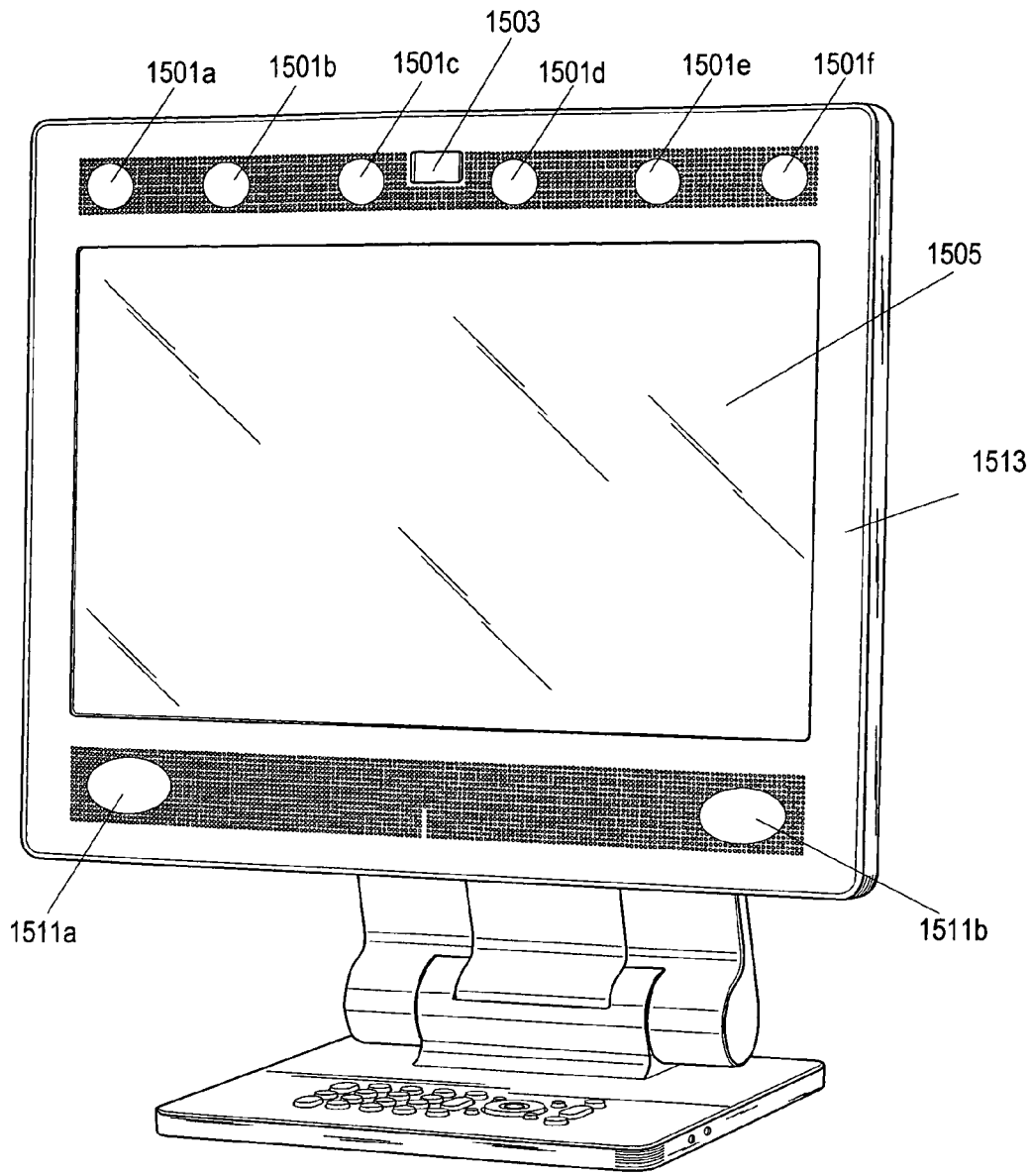
FIGS. 15a and 15b illustrate an integrated video conferencing unit, according to an embodiment.
Figure 15B:
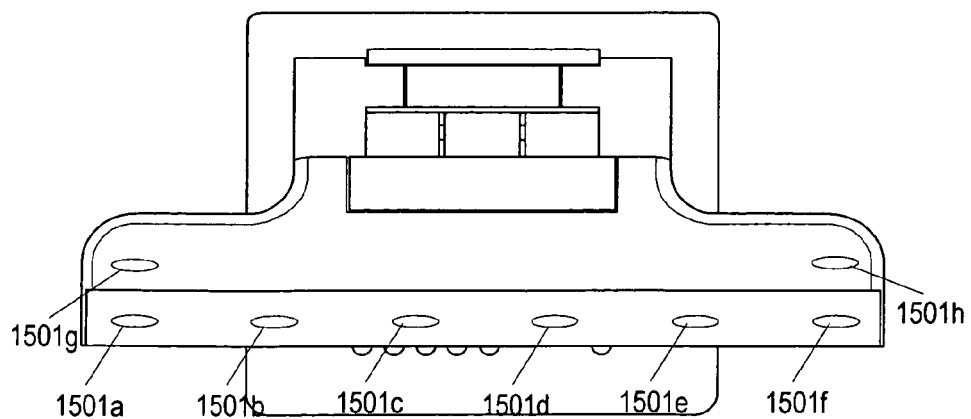

FIGS. 15a and 15b illustrate an embodiment of an integrated video conferencing unit. In some embodiments, the method of FIG. 14 may be performed with a single microphone array 1501 that is used as both the first microphone array and the second microphone array. In some embodiments, an integrated video conferencing unit may include a computing system, a plurality of microphones 1501, a camera 1503, and a display 1505 integrated in a single housing 1513. The plurality of microphones 1501 may include an array of microphones 1501 including two additional microphones 1501g,h located behind the array (as seen in FIG. 15b). Other configurations and numbers of microphones are also contemplated. In some embodiments, a subset of the microphones 1501 may form a first plurality of microphones and a subset of the microphones 1501 may form the second plurality of microphones. In some embodiments, the single housing may also include at least one speaker 1511. Other configurations of the single housing are also contemplated.

Figure 3:
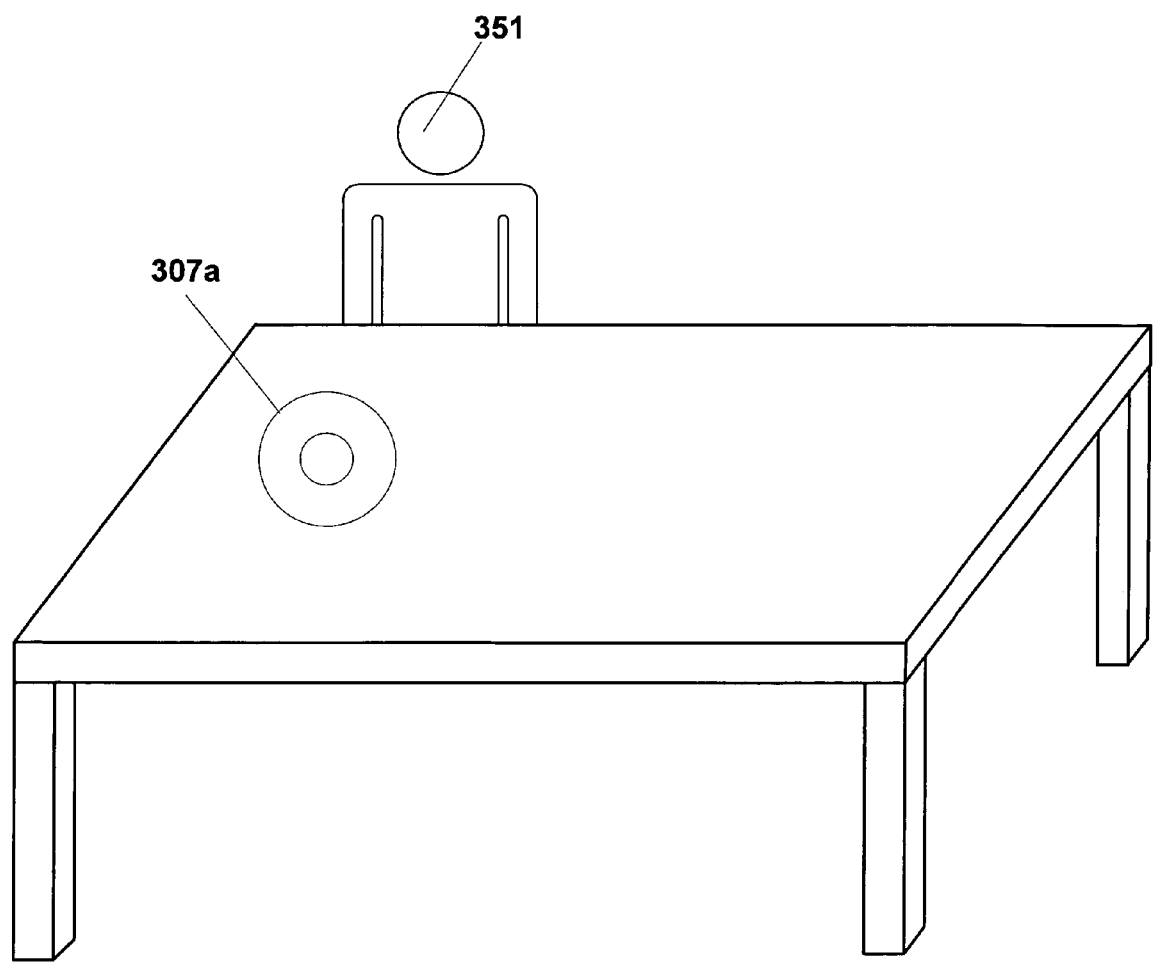
FIG. 3 illustrates a speakerphone only conference participant, according to an embodiment.

In some embodiments, audio from a speakerphone (for example, from a speakerphone only audio participant 351 seen in FIG. 3) may be reproduced through a speaker on a local speakerphone (e.g., speakerphone 105 and/or speakerphone 107). In some embodiments, if multiple audio only conference sites are participating in the conference call, and the conference system has more than one speakerphone (e.g., speakerphones 105/107), specific remote conference sites may be assigned to a specific speakerphone such that audio from different conference sites may be reproduced through a different speakerphone. In some embodiments, the audio from the audio only participants may be provided through other speakers on the system. In some embodiments, audio from video participants may be reproduced on the video conferencing sound system (e.g., speakers 171/173/175).

Embodiments of these methods may be implemented by program instructions stored in a memory medium or carrier medium. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, the computer system may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
    a first plurality of microphones;
    a second plurality of microphones for producing an audio signal of a participant; and
    a computing system coupled to the first and second plurality of microphones, wherein the computing system is configured to:
        beamform a response of the first plurality of microphones to determine directional information for the audio signal relative to the first plurality of microphones;
        beamform a response of the second plurality of microphones to determine directional information for the audio signal relative to the second plurality of microphones;
        cross correlate the beamformed response of the first plurality of microphones and the second plurality of microphones to determine final directional information for the audio signal, wherein the final directional information indicates a left side or a right side of the second plurality of microphones; and
        transmit the audio signal from the second plurality of microphones based on the final directional information, wherein the computing system is configured to transmit the audio signal by transmitting a left audio channel and a right audio channel, wherein the left audio channel comprises audio from at least one beam on the left side of the second plurality of microphones and the right audio channel comprises audio from at least one beam on the right side of the second plurality of microphones.

2. The system of claim 1, wherein the first plurality of microphones are located in a camera, and wherein the second plurality of microphones are located in a speakerphone.

3. The system of claim 1, wherein the computing system is further configured to implement an echo canceller based on the determined active participant's location.

4. The system of claim 1, further comprising a plurality of independent echo cancellers, each configured based on a potential participant location.

5. The system of claim 1, further comprising:
    a multiple channel echo canceller;
    wherein the multiple channel echo canceller is configured for multiple channels.

6. The system of claim 1, further comprising a remote conference system with speakers in at least two locations relative to the remote conference system, wherein the audio from the participant is reproduced at speakers in at least one of the two locations relative to the remote conference system based on the location of the participant relative to the system that transmitted the audio.

7. The system of claim 1, wherein a remote site uses the left and right audio channels to place the transmitted audio signal on speakers on a respective side of the remote site indicated by the left and right audio channels.

8. A method, comprising:
    beamforming audio using a first plurality of microphones to determine directional information for a conference participant relative to a conference system;
    beamforming the audio using a second plurality of microphones to determine directional information for the conference participant relative to the conference system;
    cross correlating the beamformed response from the first plurality of microphones with the beamformed response of the second plurality of microphones to determine final directional information for the audio, wherein the final directional information indicates a left side or a right side of the second plurality of microphones;
    capturing an audio signal of the conference participant using a second plurality of microphones;

transmitting the audio signal to a remote conference system based on the final directional information, wherein said transmitting the audio signal comprises transmitting a left audio channel and a right audio channel, wherein the left audio channel comprises audio from at least one beam on the left side of the second plurality of microphones and the right audio channel comprises audio from at least one beam on the right side of the second plurality of microphones;

wherein the audio signal is used to reproduce audio from the participant at the remote conference system.

9. The method of claim 8, wherein the first plurality of microphones are located in a camera, and wherein the second plurality of microphones are located in a speakerphone.

10. The method of claim 8, further comprising:
implementing an echo canceller based on the approximate location of the participant.

11. The method of claim 10, wherein the echo canceller is an independent echo canceller picked from a plurality of independent echo cancellers and wherein the specific independent echo canceller used is based on the approximate location of the participant.

12. The method of claim 8, wherein a remote site uses the left and right audio channels to place the transmitted audio signal on speakers on a respective side of the remote site indicated by the left and right audio channels.

13. A system, comprising:
a first plurality of microphones;
a second plurality of microphones for producing an audio signal of a participant; and
a computing system coupled to the first and second plurality of microphones, wherein the computing system is configured to:
beamform a response of the first plurality of microphones to determine directional information for the audio signal relative to the first plurality of microphones; and
transmit the audio signal from the second plurality of microphones and directional information, wherein the computing system is configured to transmit the audio and directional information by transmitting a left audio channel and a right audio channel, wherein the left audio channel comprises audio from at least one beam on a left side of the second plurality of microphones and the right audio channel comprises audio from at least one beam on a right side of the second plurality of microphones, and wherein the computing system is configured to determine the left side and the right side of the second plurality of microphones by cross correlating the beamformed response from the first plurality of microphones with a beamformed response of the second plurality of microphones.

14. A method, comprising:
beamforming the audio using a first plurality of microphones to determine directional information for a conference participant relative to a conference system;
capturing an audio signal of the conference participant using a second plurality of microphones;
transmitting the audio signal and directional information to a remote conference system, wherein said transmitting the audio signal and directional information comprises transmitting a left audio channel and a right audio channel, wherein the left audio channel comprises audio from at least one beam on a left side of the second plurality of microphones and the right audio channel comprises audio from at least one beam on a right side of the second plurality of microphones, and wherein the left side and the right side of the second plurality of microphones are determined by cross correlating the beamformed response from the first plurality of microphones with a beamformed response of the second plurality of microphones.

* * * * *

UNITED STATES PATENT AND TRADEMARK OFFICE
CERTIFICATE OF CORRECTION

PATENT NO. : 7,667,728 B2
APPLICATION NO. : 11/252188
DATED : February 23, 2010
INVENTOR(S) : Kenoyer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Seventh Day of December, 2010

David J. Kappos
*Director of the United States Patent and Trademark Office*